United States Patent
De Leo et al.

(10) Patent No.: US 6,989,958 B2
(45) Date of Patent: Jan. 24, 2006

(54) SCREW ATTACHMENT FROM EXTERIOR OF DISK DRIVE ENCLOSURE FOR MOTORS WITH MOUNT BRACKET SCREW BOLT PATTERN DIAMETER LARGER THAN THE MOTOR HUB OUTSIDE DIAMETER

(75) Inventors: Don E. De Leo, Gilroy, CA (US); Ta-Chang Fu, San Jose, CA (US); Ungtae Kim, San Jose, CA (US); Gregory Allen Lyons, Livermore, CA (US); Sattar Malek, San Jose, CA (US); Daniel Robert Stacer, Morgan Hill, CA (US); Stanley Yen Wong, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 106 days.

(21) Appl. No.: 10/462,363

(22) Filed: Jun. 16, 2003

(65) Prior Publication Data
US 2004/0252404 A1 Dec. 16, 2004

(51) Int. Cl.
*G11B 5/012* (2006.01)

(52) U.S. Cl. .................................................. 360/97.01
(58) Field of Classification Search .. 360/97.01–97.02, 360/98.07–98.08, 99.05, 99.12
See application file for complete search history.

(56) References Cited

U.S. PATENT DOCUMENTS

| | | | | |
|---|---|---|---|---|
| 4,553,183 A | * | 11/1985 | Brown et al. | 360/97.02 |
| 4,672,487 A | * | 6/1987 | Brand et al. | 360/98.07 |
| 5,317,462 A | * | 5/1994 | Kakizaki et al. | 360/97.02 |
| 5,600,514 A | * | 2/1997 | Fukuzawa | 360/99.08 |
| 5,602,697 A | * | 2/1997 | Jeong et al. | 360/97.02 |
| 5,694,268 A | * | 12/1997 | Dunfield et al. | 360/98.07 |
| 6,151,189 A | * | 11/2000 | Brooks | 360/97.02 |

FOREIGN PATENT DOCUMENTS

JP 56105376 * 8/1981

* cited by examiner

*Primary Examiner*—Angel Castro
(74) *Attorney, Agent, or Firm*—Bracewell & Giuliani LLP

(57) ABSTRACT

A hard disk drive has a motor mounting bracket with mounting screws that attach from outside the drive and external to the seal with a screw bolt pattern diameter that is larger than an outer diameter of the motor hub. This configuration greatly reduces contamination inside the disk drive since all contaminants due to the screws are sealed from entering the disk drive. Consequently, the bottom of the mounting bracket is extended to the form factor limit to increase the internal space that is provided for the stator/winding of the motor. In relatively high platter count disk drives, the bottom disk is positioned very close to the motor bracket with this approach, which normally would cause the air drag to increase drastically and thereby impede the performance of the disk drive. Bosses may be used on the bracket to accommodate blind tap hole depths from the external surface of the bracket.

10 Claims, 4 Drawing Sheets

SCREW ATTACHMENT FROM EXTERIOR OF DISK DRIVE ENCLOSURE FOR MOTORS WITH MOUNT BRACKET SCREW BOLT PATTERN DIAMETER LARGER THAN THE MOTOR HUB OUTSIDE DIAMETER

BACKGROUND OF THE INVENTION

1. Technical Field

The present invention relates in general to an improved hard disk drive design and, in particular, to an improved design for a hard disk drive having a screw attachment from outside the enclosure for motors with a mount bracket screw bolt pattern diameter that is larger than the motor hub outside diameter.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

One example of a prior art disk drive configuration is shown in FIG. 6. The screws 17 which secure the bracket 15 to the base 19 are located inside the seal 16 and, thus, contaminants from the screws 17 remain inside the disk drive 11. Moreover, as shown in this relatively high platter count disk drive 11, the bottom disk 13 is positioned very close to the motor bracket 15 and the screws 17 that mount the bracket 15 to the base 19. Furthermore, if the space between the disk 13 and the surface of the bracket 15 is small, the air drag can increase drastically and thereby impede the performance of the disk drive.

Another example of a prior art disk drive configuration is shown in FIG. 7. Although the single screw 27 is mounted on an exterior of the base 29 to bracket 25 and a seal 26 (such as an O-ring) can prevent contamination from screw 27, the configuration of the support portion of base 29 is required to be below the entire bracket 25 and, therefore, the available internal space in the disk drive housing is significantly reduced for the stator/winding. Thus, an improved design for mounting a hard disk drive motor to an enclosure thereof would be desirable.

SUMMARY OF THE INVENTION

In one embodiment of the present invention, the mounting screws are attached from outside the disk drive and external to the seal with a screw bolt pattern diameter that is larger than an outer diameter of the motor hub. This configuration greatly reduces contamination inside the disk drive since all contaminants due to the screws are sealed from entering the disk drive. Consequently, the bottom of the mounting bracket is extended to the form factor limit to increase the internal space that is provided for the stator/winding of the motor.

In relatively high platter count disk drives, the bottom disk is positioned very close to the motor bracket with this approach, which normally would cause the air drag to increase drastically and thereby impede the performance of the disk drive. Therefore in another embodiment of the present invention three bosses are added to the bracket to accommodate three corresponding blind tap hole depths from the outer or external surface of the bracket (e.g., for screw attachment to the base casting). As a result, a majority of the upper or internal side of the bracket surface facing the bottom disk can be positioned further away from the bottom disk in order to reduce air drag therebetween. This embodiment is most useful in high platter count disk drives.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF A PREFERRED EMBODIMENT

Figure 1:
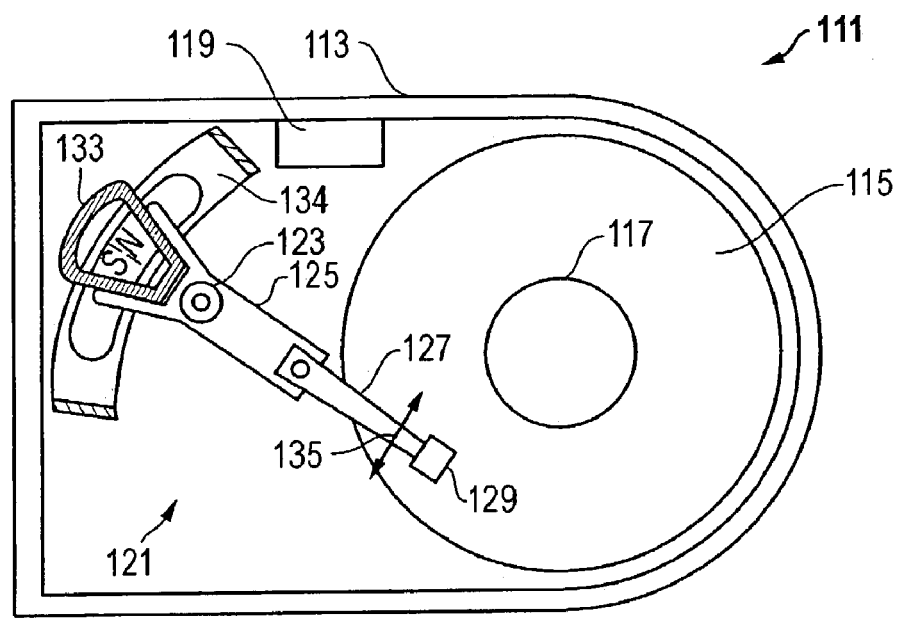
FIG. 1 is a schematic plan view of one embodiment of a hard disk drive constructed in accordance with the present invention.
Figure 3:
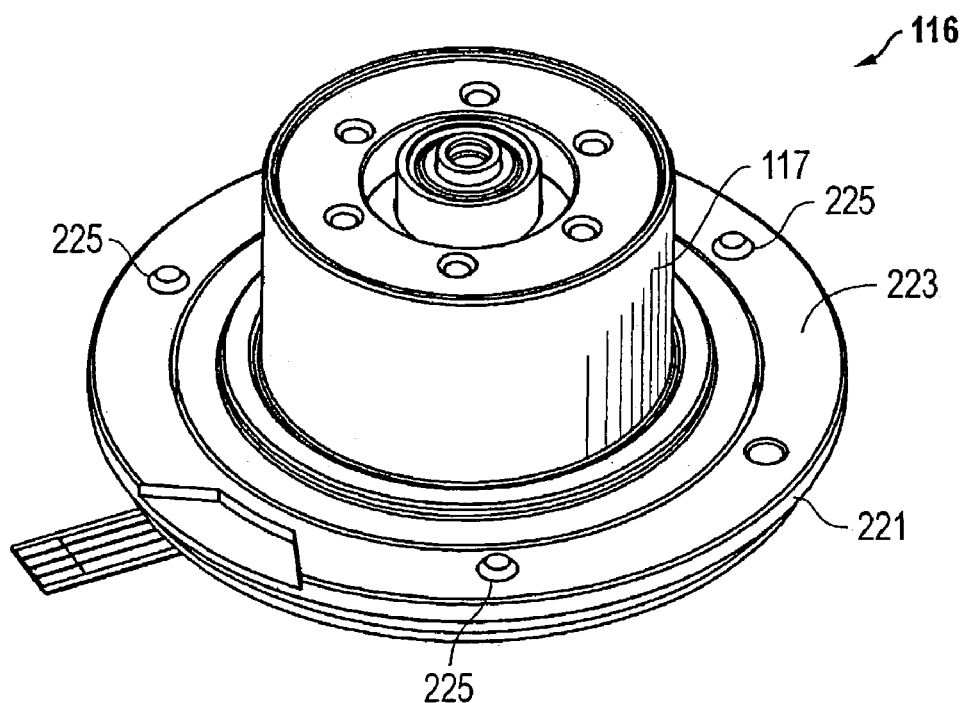
FIG. 3 is an isometric view of one embodiment of a motor and motor bracket for the hard disk drive of FIG. 1 and is constructed in accordance with the present invention.
Figure 2:
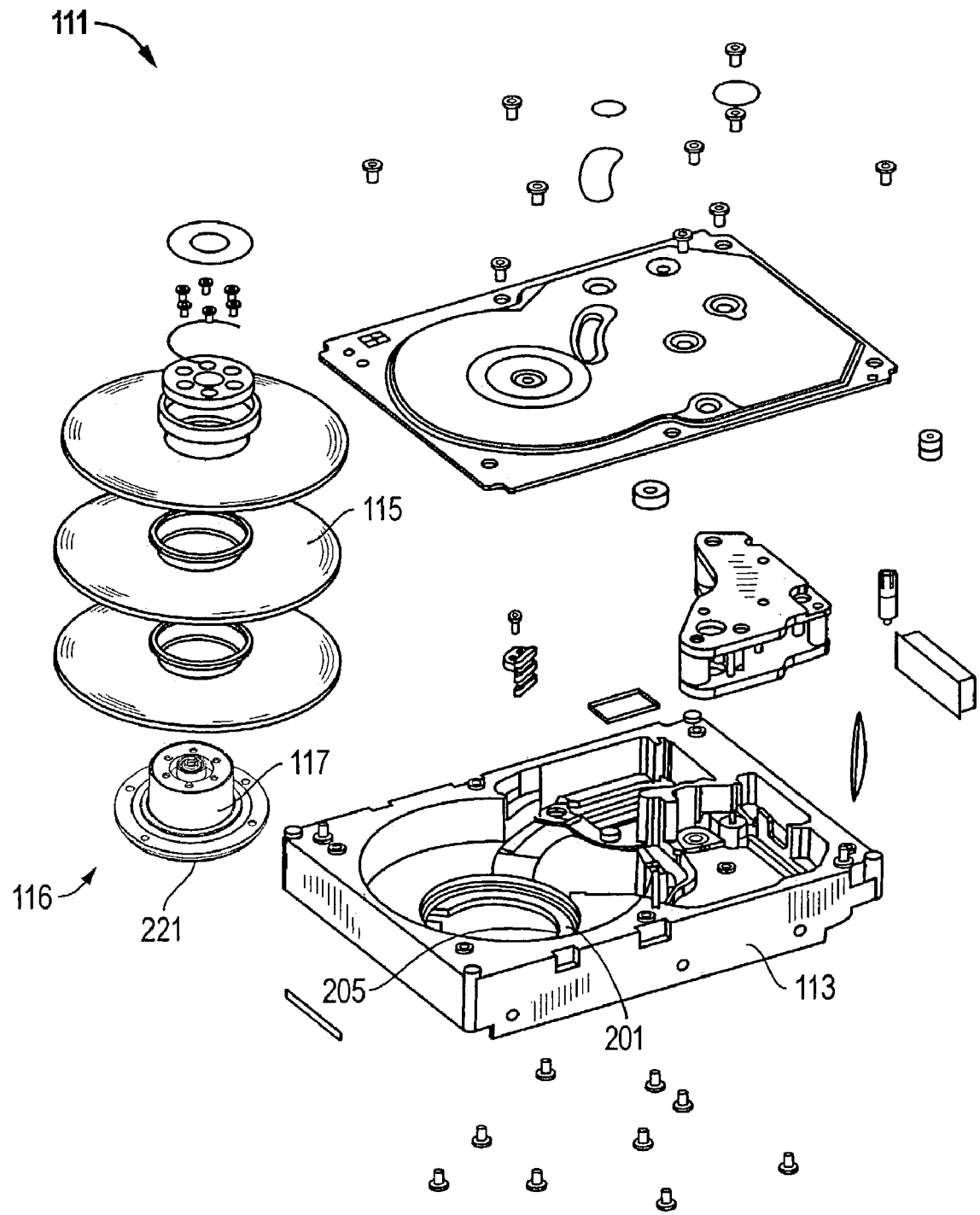
FIG. 2 is an exploded isometric view of portions of the hard disk drive of FIG. 1 which is constructed in accordance with the present invention.

Referring to FIGS. 1 and 2, a schematic drawing of one embodiment of an information storage system comprising a magnetic hard disk file or drive 111 for a computer system is shown. Drive 111 has an outer housing or enclosure 113 containing a plurality of stacked, parallel magnetic disks 115 which are closely spaced apart. Disks 115 are rotated by a spindle motor assembly 116 having a central drive hub 117. An actuator 121 (FIG. 1) comprises a plurality of parallel actuator arms 125 (one shown) in the form of a comb that is pivotally mounted to enclosure 113 about a pivot assembly 123. A controller 119 is also mounted to enclosure 113 for selectively moving the comb of arms 125 relative to disks 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disks 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be nano size (approximately 850×700×230 microns) and is pre-loaded against the surface of disk 115 (in the range two to ten grams) by suspension 127.

Suspensions 127 have a spring-like quality which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disks 115 until the heads settle on their respective target tracks. The head gimbal assemblies operate in a conventional manner and always move in unison with one another, unless drive 111 uses multiple independent actuators (not shown) wherein the arms can move independently of one another.

Figure 4:
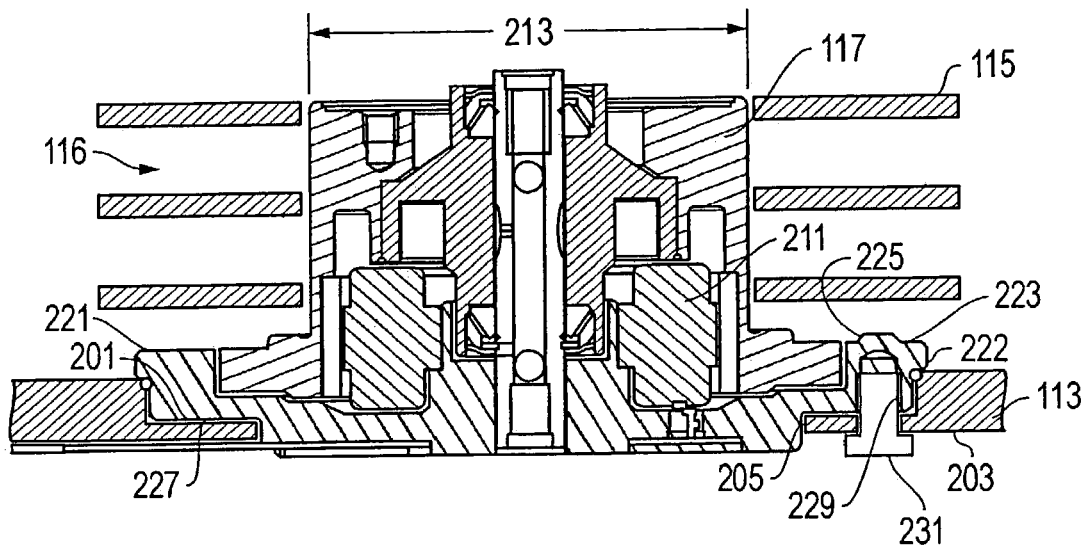
FIG. 4 is a sectional side view of the motor and motor bracket of FIG. 3 and is constructed in accordance with the present invention.
Figure 5:
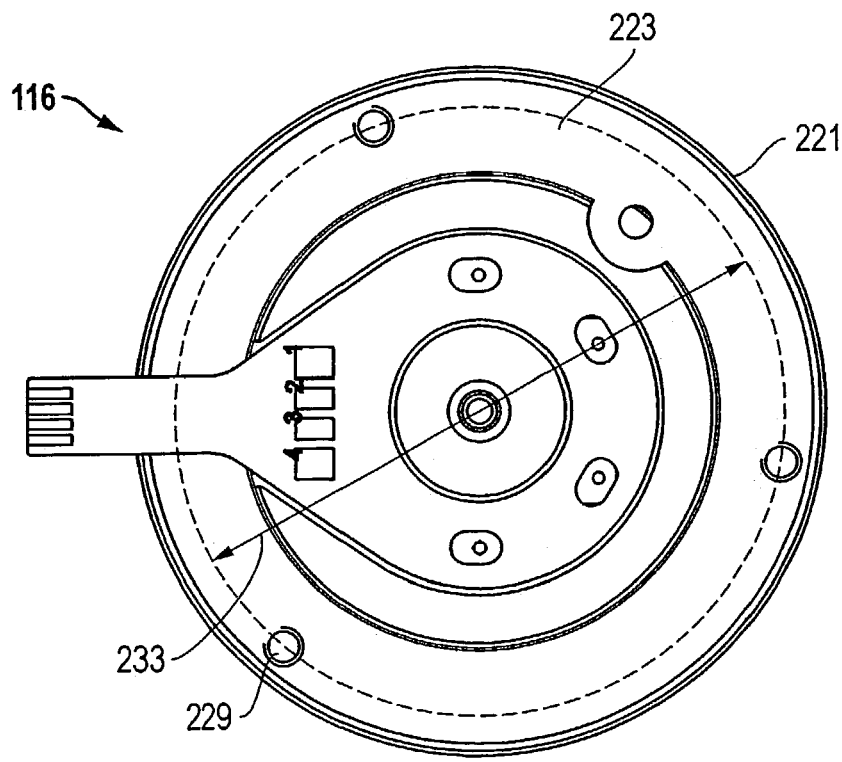
FIG. 5 is a bottom view of the motor and motor bracket of FIG. 3 and is constructed in accordance with the present invention.
Figure 6:
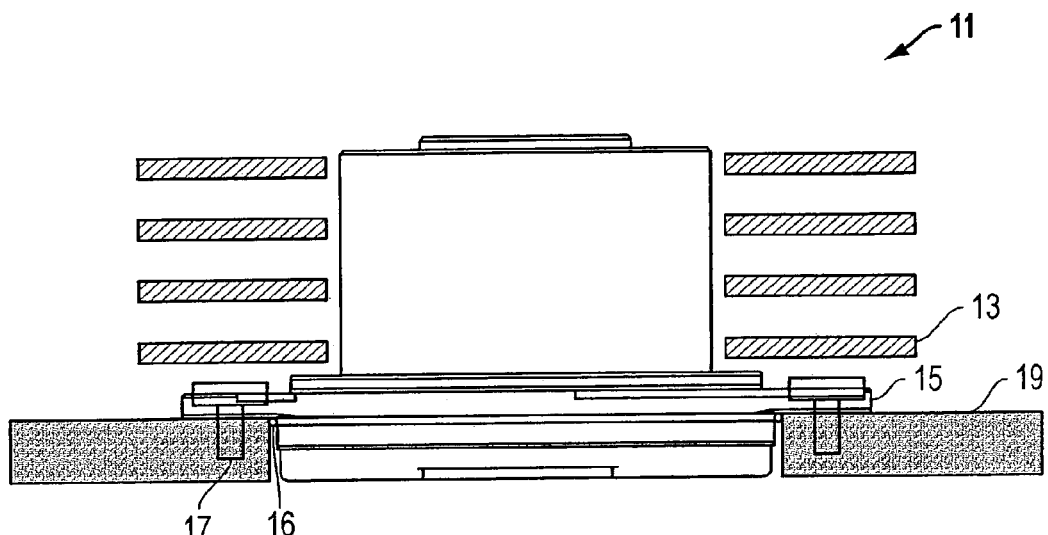
FIG. 6 is a sectional side view of one type of prior art motor mounting design for a conventional hard disk drive.

Referring now to FIGS. 2–5, the outer housing or enclosure 113 of hard disk drive 11 has an interior surface 201, an exterior surface 203, and, in one embodiment, a motor aperture 205 formed therein. In the version shown, the motor assembly 116 is located in the motor aperture 205, as best shown in FIG. 4. The motor assembly 116 also has a stator/winding 211, the motor hub 117 with an outer diameter 213, and the media storage disks 115 are mounted to the motor hub 117 for rotation therewith.

The motor assembly 116 also has a bracket 221 for mounting the motor to the enclosure 113. In one embodiment, the bracket 221 has a disk-side surface 223 with a plurality of bosses 225 protruding from the disk-side surface 223 adjacent to a lowermost or nearest one of the media storage disks 115. A mounting surface 227 of the bracket 221 faces and abuts the interior surface 201 of the enclosure 113. A plurality of openings or, in one embodiment, blind tap holes 229 are formed in the mounting surface 227. The plurality of blind tap holes 229 are aligned with and correspond to respective ones of the plurality of bosses 225 in both angular and radial directions. Due to the presence of the blind tap holes 229, the bosses 225 are provided to increase the strength of bracket 221.

Figure 7:
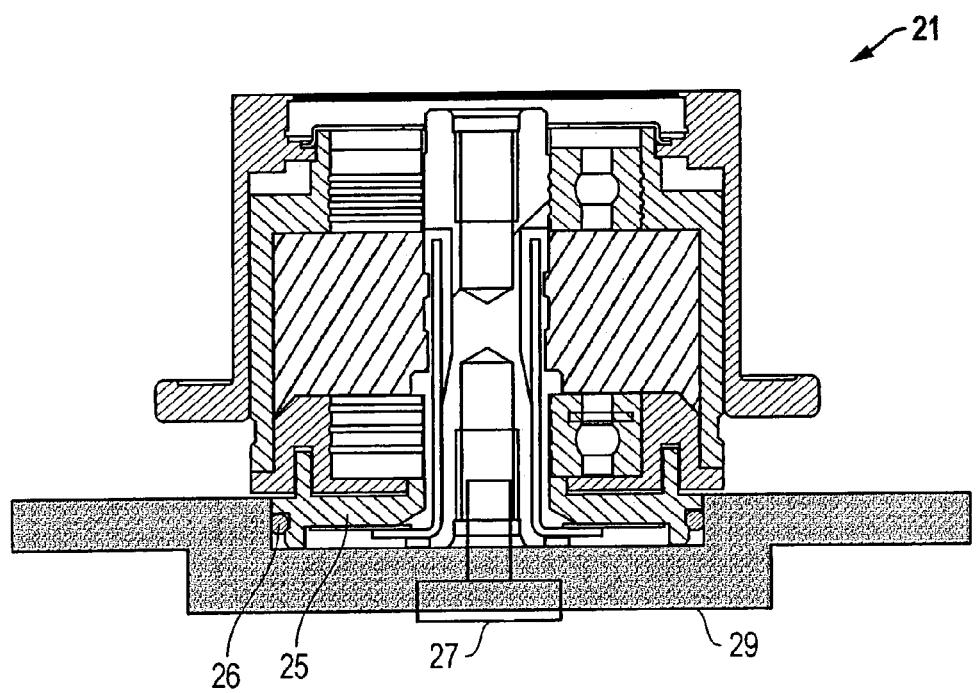
FIG. 7 is a sectional side view of another type of prior art motor mounting design for a conventional hard disk drive.

A plurality of fasteners 231, such as threaded screws and the like, extend through the exterior surface 227 of the enclosure 113 into engagement with the blind tap holes 229 in the bracket 221 for securing the motor assembly 116 to the enclosure 113. In this way, most of the disk-side surface 223 of the bracket 221 facing the media storage disks 115 is positioned away from a nearest one of the media storage disks 115 to reduce air drag therebetween, and to reduce contamination within the enclosure 113. Contamination in drive 111 is reduced because the fasteners 231 are located radially inboard of a seal 222 (FIG. 4), such as an o-ring, that is positioned between enclosure 113 and bracket 221. In addition, the bracket 221 has a screw bolt pattern diameter 233 that is larger than the outer diameter 213 of the motor hub 117. A bottom of the bracket is extended to a form factor limit of the hard disk drive to increase an internal space that is provided for the stator/winding of the motor, since no support is needed from below the bracket 221 due to the increased bolt-circle diameter that shifts the fasteners 231 (with respect to the prior art FIG. 7) to the outer perimeter. As a result, the motor assembly 116 is located all the way down to the same level as the bottom of the form factor limit (see FIG. 4). Typically, everything is stretched to the limit to put in as many required features as possible in order to increase performance, and the space located inside the motor assembly 116 is thereby increased for the stator/winding.

The present invention has several advantages, including the primary benefits of reducing contamination and allowing the disk pack to be built outside the base casting. Since the fasteners are attached from the outside the base and in a bolt circle that is larger than the motor hub OD, no base support is required below the entire bottom side of the bracket (compare prior art FIG. 7), and therefore allows larger internal winding space to meet motor electromagnet performance requirements. In a high platter count disk drive, this solution would have made the motor bracket very close to the bottom disk and, hence, increase the drag. Therefore three bosses are introduced to accommodate the tapped hole depth and largely reduce the area which is close to the bottom disk in the drive.

The hard disk with a motor mounting bracket having three bosses to accommodate three corresponding blind tap hole depths from the outer or external surface of the bracket (e.g., for screw attachment to the base casting). The upper or internal side of the bracket surface facing the bottom disk is positioned further away from the bottom disk in order to reduce air drag therebetween. In addition, the present invention provides the hard disk drive with a motor mounting bracket having a screw bolt pattern diameter that is larger than an outer diameter of the motor hub. Consequently, the bottom of the bracket is extended to the form factor limit to increase the internal space that is provided for the stator/winding of the motor. These features enable to the motor to be attached to the base casting via the bracket with fasteners that extend from outside the base casting and outside the seal between the base casting and the motor bracket. Such a configuration significantly reduces the possibility of contamination within the disk drive housing.

While the invention has been shown or described in only some of its forms, it should be apparent to those skilled in the art that it is not so limited, but is susceptible to various changes without departing from the scope of the invention.

What is claimed is:

1. A hard disk drive, comprising:
    an enclosure having an interior surface, an exterior surface opposite the interior surface;
    a motor having a motor hub and media storage disks mounted to the motor hub for rotation therewith;
    an actuator mounted to the enclosure for moving read/write heads relative to the media storage disks for reading data from and writing data to the media storage disks;
    a bracket for mounting the motor to the enclosure, the bracket having a disk-side surface facing the media storage disks, a mounting surface facing and abutting the interior surface of the enclosure, and a plurality of openings in the mounting surface;
    a plurality of fasteners extending through the exterior surface of the enclosure into engagement with the openings in the bracket for securing the motor to the enclosure; and
    a seal positioned between the enclosure and the bracket such that the fasteners are located external of the seal and any contamination due to the fasteners is sealed from entering the enclosure; and wherein
    the openings in the bracket are blind tap holes.

2. The hard disk drive of claim 1, wherein the bracket has a screw bolt pattern diameter that is larger than an outer diameter of the motor hub.

3. The hard disk drive of claim 1, wherein the bracket is extended to a form factor limit of the hard disk drive to increase an internal space that is provided for a stator/winding of the motor.

4. The hard disk drive of claim 1, wherein the enclosure has a motor aperture formed therein, and the motor is located in the motor aperture.

5. The hard disk drive of claim 1, wherein the disk-side surface of the bracket facing the media storage disks is positioned away from a nearest one of the media storage disks to reduce air drag therebetween, and to reduce contamination within the enclosure.

6. A hard disk drive, comprising:
    an enclosure having an interior surface, an exterior surface opposite the interior surface;
    a motor having a motor hub and media storage disks mounted to the motor hub for rotation therewith;
    an actuator mounted to the enclosure for moving read/write heads relative to the media storage disks for reading data from and writing data to the media storage disks;
    a bracket for mounting the motor to the enclosure, the bracket having a disk-side surface facing the media storage disks, a mounting surface facing and abutting the interior surface of the enclosure, and a plurality of openings in the mounting surface;
    a plurality of fasteners extending through the exterior surface of the enclosure into engagement with the openings in the bracket for securing the motor to the enclosure; and
    a seal positioned between the enclosure and the bracket such that the fasteners are located external of the seal and any contamination due to the fasteners is sealed from entering the enclosure; wherein
    the bracket has a plurality of bosses protruding from the disk-side surface adjacent to the media storage disks; and wherein
    the openings in the bracket are aligned with and correspond to respective ones of the plurality of bosses.

7. A hard disk drive, comprising:
    an enclosure having a motor aperture formed therein, an interior surface, an exterior surface opposite the interior surface;
    a motor located in the motor aperture, the motor having a motor hub and media storage disks mounted to the motor hub for rotation therewith;
    an actuator mounted to the enclosure for moving read/write heads relative to the media storage disks for reading data from and writing data to the media storage disks;
    a bracket for mounting the motor to the enclosure, the bracket having a disk-side surface with a plurality of bosses protruding from the disk-side surface adjacent to the media storage disks, a mounting surface facing and abutting the interior surface of the enclosure, and a plurality of blind tap holes formed in the mounting surface, the plurality of blind tap holes being aligned with and corresponding to respective ones of the plurality of bosses;
    a seal positioned between the enclosure and the bracket; and
    a plurality of fasteners extending through the exterior surface of the enclosure into engagement with the blind tap holes in the bracket for securing the motor to the enclosure, the fasteners being located radially inboard of the seal, such that any contamination due to the fasteners is sealed from entering the enclosure, and the disk-side surface of the bracket facing the media storage disks is positioned away from a nearest one of the media storage disks to reduce air drag therebetween.

8. The hard disk drive of claim 7, wherein the bracket has a screw bolt pattern diameter that is larger than an outer diameter of the motor hub.

9. The hard disk drive of claim 7, wherein a bottom of the bracket is extended to a form factor limit of the hard disk drive to increase an internal space that is provided for a stator/winding of the motor.

10. A hard disk drive, comprising:
    an enclosure having an interior surface and an exterior surface and a motor aperture formed therein;
    a motor located in the motor aperture, the motor having, and a stator/winding, a motor hub with an outer diameter, and media storage disks mounted to the motor hub for rotation therewith;
    an actuator mounted to the enclosure for moving read/write heads relative to the media storage disks for reading data from and writing data to the media storage disks;

a bracket for mounting the motor to the enclosure, the bracket having a disk-side surface with a plurality of bosses protruding from the disk-side surface adjacent to the media storage disks, a mounting surface facing and abutting the interior surface of the enclosure, and a plurality of blind tap holes formed in the mounting surface, the plurality of blind tap holes being aligned with and corresponding to respective ones of the plurality of bosses;

a seal positioned between the enclosure and the bracket;

a plurality of fasteners extending through the exterior surface of the enclosure into engagement with the blind tap holes in the bracket for securing the motor to the enclosure, the fasteners being located radially inboard of the seal, such that any contamination due to the fasteners is sealed from entering the enclosure, and the disk-side surface of the bracket facing the media storage disks is positioned away from a nearest one of the media storage disks to reduce air drag therebetween; and the bracket having a screw bolt pattern diameter that is larger than the outer diameter of the motor hub, and a bottom of the bracket is extended to a form factor limit of the hard disk drive to increase an internal space that is provided for the stator/winding of the motor.

* * * * *